3,294,815
PROCESS FOR PRODUCING 1,4-NAPHTHOQUI-
NONES[2,3-f]-PHTHALIMIDES
Ernst Hartwig and Willy Braun, Heidelberg, Germany,
assignors to Badische Anilin- & Soda-Fabrik Aktienge-
sellschaft, Ludwigshafen (Rhine), Germany
No Drawing. Filed Nov. 24, 1964, Ser. No. 413,606
Claims priority, application Germany, Nov. 30, 1963,
B 74,474
4 Claims. (Cl. 260—325)

This invention relates to a new process for the production of anthraquinone dyes.

We have found that anthraquinone dyes of the general Formula I:

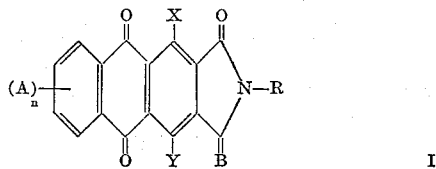

where X is a hydroxyl or amino group, Y a hydroxyl, amino or methylamino group, A a hydrogen, chlorine or bromine atom, B an oxygen atom or an imino group which may bear an alkyl, cycloalkyl, aryl or aralkyl radical, and R is a hydrogen atom, an unsubstituted or substituted alkyl, cycloalkyl, aryl or aralkyl group, and $n$ denotes the number 1 or 2, are obtained by reacting a compound of the formula:

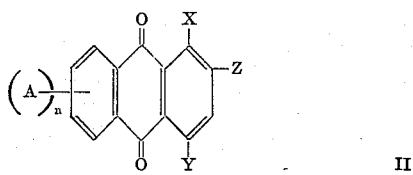

where the radical Z is a hydrogen atom, a cyano group, a carboxyl group, a carbalkoxyl group, a —CO—NH—R group or a

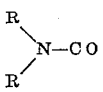

group, and X, Y, A, R and $n$ have the meanings given above, with an ionic cyanide or a compound which splits off a cyanogen group under the reaction conditions, if desired in the presence of a primary amine, an oxidizing agent being allowed to act either simultaneously or subsequently.

Examples of anthraquinone derivatives of the general Formula II to be used in the new process include 1,4-diaminoanthraquinone, 1-amino-4-hydroxyanthraquinone, 1,4-dihydroxyanthraquinone, 1,4-diaminoanthraquinone-2-carboxylic acid, 1,4-diaminoanthraquinone-2-carboxamide, 1,4-diaminoanthraquinone-2-carboxylic acid dimethylamide, 1,4 - diaminoanthraquinone-2-carboxylic acid methyl ester, 1,4-diaminoanthraquinone-2-carboxylic acid γ-methoxypropylamide, 1,4-diamino-2-cyanoanthraquinone, 1 - amino - 4 - hydroxyanthraquinone-2-carboxamide, 1-amino - 4 - methylamino-2-cyanoanthraquinone and 1,4-dihydroxy-5,8-dichloroanthraquinone.

Examples of suitable ionic cyanides are alkali or alkaline earth metal cyanides such as sodium cyanide, potassium cyanide, ammonium cyanide, magnesium cyanide or calcium cyanide or mixtures thereof. Compounds which under the reaction conditions eliminate the cyanogen group include α-hydroxynitriles (cyanohydrins) such as acetocyanohydrin or mandelonitrile or α-aminonitriles such as α-aminopropionitrile. The cyanides or the compounds eliminating cyanogen groups are used in at least molar amounts, based on the anthraquinone compound, an excess is however preferred. The compounds may be generally referred to as cyanogen compounds, i.e., compounds having a —CN group in the molecule.

The reaction of the cyanides or the compounds eliminating the cyanogen group with the anthraquinone compounds of the general Formula II to form anthraquinone dyes of the general Formula I is advantageously carried out in a solvent which is inert to the reactants, and an oxidizing agent is allowed to act either simultaneously or subsequently.

As inert diluents there may be mentioned polar solvents, e.g., water, alcohols, ethers such as glycol monomethyl ether, acid amides such as formamide, dimethylformamide or N-methylpyrrolidone, organic bases such as pyridine, sulfoxides or sulfones such as dimethyl sulfoxide or tetramethylenesulfone which may also be used in admixture with each other, or solutions of salts, such as potassium hydroxide or sodium carbonate, in water or solvent mixtures of the said kind which contain water, or melts of salts such as potassium acetate, sodium acetate, sodium carbonate or potassium hydroxide, or melts of mixtures of the said salts.

As oxidizing agent there may be used, for example, atmospheric oxygen by passing air through the reaction mixture, it being expedient to add small amounts of an oxygen transferrer such as ammonium vanadate. Other oxidizing agents are substances which readily eliminate oxygen, such as salts of peroxy acids, e.g., sodium perborate, alkali metal chlorates, e.g., potassium chlorate, or nitro compounds. The oxidizing agent is used in an amount of at least two oxidation equivalents, based on the anthraquinone compound. It is however advantageous to use an excess.

The reaction is generally carried out at temperatures between 30 and 230° C., temperatures between 60 and 180° C. being preferred.

In the new process, the reaction of the anthraquinone compounds of the general Formula II in the said diluents with the cyanides or nitriles and the oxidizing agents may also be carried out in the presence of primary amines. Examples of primary amines are aliphatic amines or alkylamines such as methylamine, ethylamine or butylamine, cycloalkylamines such as cyclohexylamine or methylcyclohexylamine, and araliphatic amines such as benzylamine. The carbon chain of the amines which may also be unsaturated may bear further substituents such as hydroxy, alkoxy, amino, alkylamino, dialkylamino and cyano groups or hetero rings such as a pyrrolidine, pyrrolidone, morpholine or piperidine nucleus. The amines are used in at least molar amounts, based on the anthraquinone compound.

The new process gives anthraquinone compounds of the general Formula I in which Y is either oxygen or an imino group. Since however the imino group may be partially saponified under the reaction conditions, some of the dyes obtained are mixtures of the imino and oxo compounds. If the starting materials used for the new process are anthraquinone compounds of the general Formula II which contain a disubstituted carboxamide group in 2-position, the reaction gives anthraquinone-2,3-dicarboximides with elimination of a secondary amine.

Some of the dyes obtainable according to the new process are new compounds. The are eminently suitable for dyeing structures of polyester and other materials such as polyacrylonitrile, and are valuable intermediates for the manufacture of other dyes. As compared with the process known from U.S. patent specification No. 3,137,699 the new process is distinguished by its wider applicability.

Example 1

10 parts of 1,4-diaminoanthraquinone-2-carboxylic acid γ-methoxypropylamide is stirred with 50 parts of formamide and then 10 parts of potassium cyanide is added. The mixture is heated to 90 to 95° C. while passing air through it and stirring is continued at this temperature until the shade of color of a sample no longer turns more greenish upon dilution. This is usually the case after three hours. Oxidation may be accelerated by adding 0.02 part of ammonium vanadate. After cooling, the crystalline product is filtered off and washed with 25 parts of formamide and then with hot water until the wash water runs away colorless. Finally, the product is washed with 30 parts of methanol in several portions, the last portions running away exclusively greenish blue in color. By drying, 9 parts of a dye is obtained which crystallizes in the form of deep blue needles and melts at 197 to 198° C. The dye has the formula

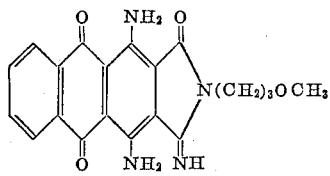

and dyes polyester materials clear greenish blue shades having excellent fastness properties.

Dyes of the formula

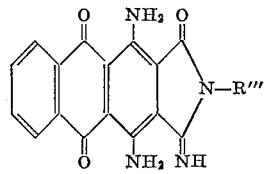

where R''' is one of the radicals

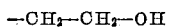   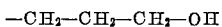

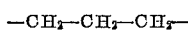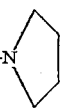   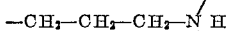

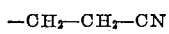   

   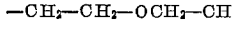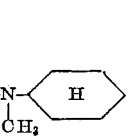

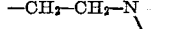

are obtained by starting from similarly substituted anthraquinone-2-carboxamides.

Example 2

60 parts of water, 40 parts of potassium cyanide, 10 parts of potassium hydroxide, 45 parts of dimethyl sulfoxide and 10 parts of 1,4-diaminoanthraquinone-2-carboxylic acid γ-methoxypropylamide are mixed and the mixture is heated to 90 to 95° C. 25 parts of sodium perborate is added over a period of about 2 hours while stirring and stirring is continued until a sample no longer turns more greenish when dissolved in dimethylformamide. This is the case after approximately 2 hours. After cooling, the product is added to 400 parts of water through which air may be blown, filtered off, and washed with hot water until the wash water runs away colorless. 9 parts of the dye described in Example 1 is obtained after drying.

The same result is obtained by fusing together 81 parts of potassium acetate and 96 parts of crystalline sodium acetate, adding at 110 to 115° C. 4.5 parts of sodium carbonate, 10 parts of powdered potassium hydroxide, 20 parts of potassium cyanide, 0.5 part of ammonium vanadate and 10 parts of 1,4-diaminoanthraquinone-2-carboxylic acid γ-methoxypropylamide, stirring some 3 to 4 hours at 110 to 115° C. while passing air through the mixture, working up by carefully dripping in water until the internal temperature has fallen to approximately 80 to 90° C., adding the whole to some 600 parts of water through which air may be blown, filtering off, washing with water until the wash water runs away colorless, and drying the residue.

Example 3

10 parts of 1,4-diaminoanthraquinone-2-carboxylic acid methyl ester is treated as described in Example 1 and worked up. 8 parts of 1,4-diaminoanthraquinone-2,3-dicarboximide is obtained.

The same result is obtained by using 1,4-diaminoanthraquinone-2-carboxylic acid dimethylamide as the starting material.

Example 4

10 parts of sodium cyanide is added to 50 parts of dimethyl sulfoxide while stirring and the mixture is heated to 90 to 95° C. Then 10 parts of 1-amino-4-hydroxyanthraquinone is stirred in and the said temperature is maintained while stirring and passing air through until the shade of color of a sample no longer turns more bluish upon dilution with dimethylformamide. This is usually the case after 3 to 4 hours. The product is added to approximately 400 parts of water, the whole is stirred at 50 to 60° C. for approximately half an hour, and the product is filtered off and washed neutral with a little methanol about three times. By drying, 9.5 parts of a black violet powder of Formula I is obtained where X is NH₂, Y is OH, R is H and B is NH. If the reaction is carried out in the presence of a primary amine, a mixture of a dye of the Formula I containing an imino group with a dye of the Formula I containing a substituted imino group are obtained.

If 1,4-dihydroxyanthraquinone be substituted for 1-amino-4-hydroxyanthraquinone as the starting material, there is obtained in a good yield a mixture of a compound having the Formula I where each of X and Y is OH, R is H and B is NH, and a compound having the Formula I where B is an oxygen atom and X, Y and R have the said meanings. The substance is a black brown microcrystalline powder which melts at 220° C. with decomposition and dissolves in dimethylformamide with a red-brown color and in concentrated sulfuric acid with a bluish red color.

Example 5

10 parts of 1,4-diaminoanthraquinone-2-carboxamide, 10 parts of sodium cyanide and 50 parts of dimethylformamide are stirred together and heated to 90 to 95° C. while passing air therethrough. Stirring is continued at the said temperature until the shade of color of a sample no longer turns more greenish when diluted. This is usually the case after only about an hour. After cooling, the mixture is stirred into about 400 parts of water and worked up as described in Example 2. The product is dried and 8.5 parts of a black blue powder of the Formula I is obtained where both X and Y are NH₂, R is H and B is NH.

The same dye is obtained by treating 10 parts of 1,4-diaminoanthraquinone, 10 parts of sodium cyanide and 50 parts of dimethyl sulfoxide in the manner described above. If the reaction is carried out in the presence of a primary amine, dyes of the Formula I are obtained where some of the imino groups are substituted.

We claim:
1. A process for the production of an anthraquinone dye of the formula

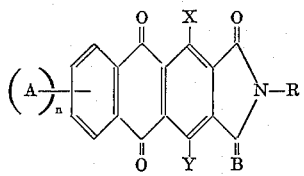

in which
X denotes a member selected from the class consisting of hydroxyl and amino,
Y denotes a member selected from the class consisting of hydroxyl, amino and methylamino,
A denotes an atom selected from the class consisting of hydrogen, chlorine and bromine,
B denotes a divalent member selected from the class consisting of oxygen and imino,
R denotes a member selected from the class consisting of hydrogen, alkyl of 1 to 4 carbon atoms and alkyl of 1 to 4 carbon atoms substituted by a member selected from the class consisting of hydroxy, methoxy, ethoxy, hydroxyethoxy, cyano, pyrrolidino, pyrrolidonyl and N-methylcyclohexyamino, and
$n$ is one of the numbers 1 and 2, which comprises heating a compound of the formula

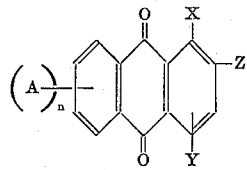

in which A, X, Y, and $n$ have the meanings given above and Z denotes a member selected from the class consisting of hydrogen, cyano, carboxy, carbalkoxy, the carboxamide group of the formula —CO—NH—R in which R has one of the above meanings, and the carboxamide group of the formula

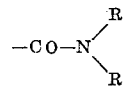

in which R has one of the above meanings, with a cyanogen compound selected from the class consisting of an ionic cyanide and a cyanogen compound which is capable of splitting off the cyano group during the reaction, and with an oxidizing agent in an inert diluent at a temperature from 30 to 230° C.

2. A process for the production of a dye of the formula

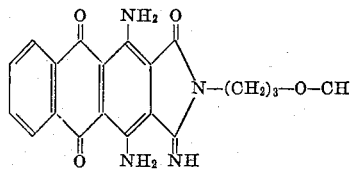

which comprises heating 1,4-diaminoanthraquinone-2-carboxylic acid γ-methoxypropylamide with a cyanogen compound selected from the class consisting of an ionic cyanide and a cyanogen compound which is capable of splitting off the cyano group during the reaction, and with an oxidizing agent in an inert diluent at a temperature of from 30 to 230° C.

3. A process as defined in claim 1 wherein heating is carried out in the presence of an oxygen transferrer.

4. A process as claimed in claim 1 wherein said heating is carried out at a temperature of about 60° C. to 180° C.

References Cited by the Examiner
UNITED STATES PATENTS
3,137,699  6/1964  Hartwig et al. _____ 260—325
FOREIGN PATENTS
928,700  6/1963  Great Britain.

ALEX MAZEL, *Primary Examiner.*

HENRY R. JILES, *Examiner.*

JOSE TOVAR, *Assistant Examiner.*